United States Patent
McDonough et al.

(10) Patent No.: US 7,298,777 B2
(45) Date of Patent: Nov. 20, 2007

(54) SEARCHING IN A SPREAD SPECTRUM COMMUNICATIONS

(75) Inventors: John G. McDonough, La Jolla, CA (US); Gibong Jeong, San Diego, CA (US); Karim Abdulla, San Diego, CA (US); Rajiv R. Nambiar, San Diego, CA (US); William S. Clark, Jr., Escondido, CA (US)

(73) Assignee: Texas Instruments Incorporated, Dallas, TX (US)

( * ) Notice: Subject to any disclaimer, the term of this patent is extended or adjusted under 35 U.S.C. 154(b) by 680 days.

(21) Appl. No.: 10/455,020

(22) Filed: Jun. 6, 2003

(65) Prior Publication Data
US 2004/0247019 A1 Dec. 9, 2004

(51) Int. Cl.
*H04B 1/00* (2006.01)
(52) U.S. Cl. .............. 375/148; 375/147; 375/150; 375/142; 375/144; 370/335; 370/336; 370/342; 370/441
(58) Field of Classification Search ........... 375/148, 375/316, 147, 150, 142, 144; 370/310, 342, 370/335, 336, 441
See application file for complete search history.

(56) References Cited

U.S. PATENT DOCUMENTS

| | | | |
|---|---|---|---|
| 5,440,597 A | 8/1995 | Chung et al. ............... 375/200 |
| 5,577,022 A | 11/1996 | Padovani et al. ............. 370/13 |
| 5,642,377 A | 6/1997 | Chung et al. ............... 375/200 |
| 5,710,768 A * | 1/1998 | Ziv et al. .................... 370/342 |
| 6,363,108 B1 * | 3/2002 | Agrawal et al. ............ 375/152 |
| 6,542,478 B1 | 4/2003 | Park ........................... 370/308 |
| 6,944,149 B1 * | 9/2005 | Kim et al. ................... 370/349 |
| 7,085,246 B1 * | 8/2006 | LaRosa et al. .............. 370/311 |
| 2003/0002566 A1 | 1/2003 | McDonough et al. ....... 375/147 |
| 2003/0053518 A1 | 3/2003 | McDonough ............... 375/130 |

OTHER PUBLICATIONS

Yi Sun, *A Generalized Search Rule Of Likelihood Ascent Search Detectors For CDMA Multiuser Detection*, (6p.).

* cited by examiner

*Primary Examiner*—Mohammed Ghayour
*Assistant Examiner*—Leila Malek
(74) *Attorney, Agent, or Firm*—Dolly Y. Wu; W. James Brady; Frederick J. Telecky, Jr.

(57) ABSTRACT

This disclosure is generally directed to communication systems, devices used in communication systems and associated methods which may implement parallel hypothesis search techniques. The disclosed parallel hypothesis search techniques may permit a hypothesis to be dismissed early (i.e., before hypotheses in other searchers have completed their evaluation). Early hypothesis dismissal permits a new hypothesis to be loaded into the searcher while other searchers advantageously continue to evaluate their hypotheses.

19 Claims, 6 Drawing Sheets

| 18 | 15 | 14 | 3 | 2 | 0 |
|---|---|---|---|---|---|
| SLOT NUMBER [0..15] | | CHIP COUNT [0..2559] | | SUBCHIP COUNT [0..8] | |
*FIG. 6A*
| 19 | 18 | 17 | 3 | 2 | 0 |
|---|---|---|---|---|---|
| FRAME COUNT [0..2] | | CHIP COUNT [0..32,767] | | SUBCHIP COUNT [0..7] | |
*FIG. 6B*
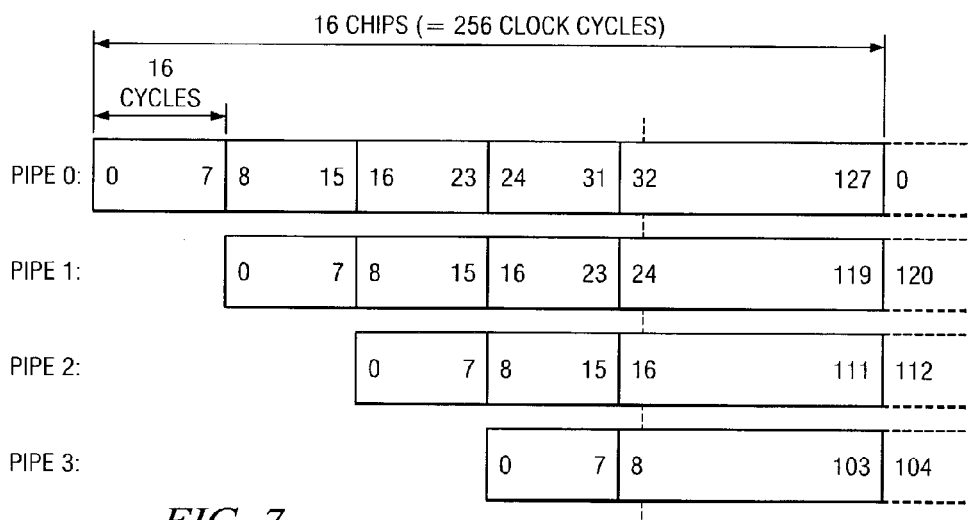
*FIG. 7*
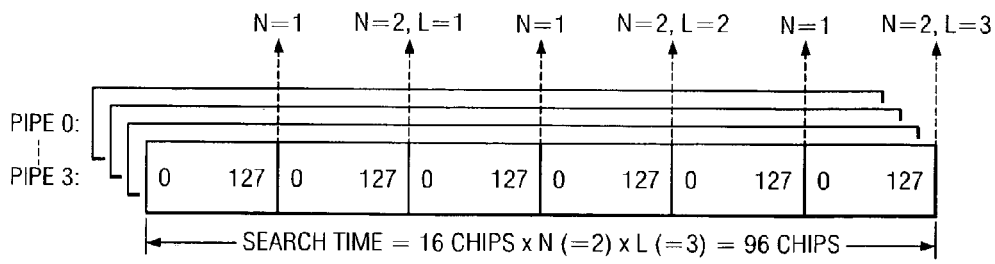
*FIG. 8*

SEARCHING IN A SPREAD SPECTRUM COMMUNICATIONS

BACKGROUND OF THE INVENTION

1. Field of the Invention

The present invention generally relates to communication systems. More particularly, the invention generally relates to an improved synchronization search technique and more particularly to using a random access sequence generator during the synchronization search process.

2. Background Information

In some cellular networks, information (e.g., voice signals) are encoded with a scrambling code, transmitted to a receiving device, and decoded by the receiving device. In CDMA cellular networks like W-CDMA and CDMA2000 systems, each cell or base station sector uses a different time offset of the scrambling code. To establish a communication link, the mobile station searches for a cell and determines the frame synchronization associated with that cell.

To achieve this synchronization, the mobile station uses a "searcher" to perform initial cell acquisition, cell measurement and delay profile estimation. The mobile station may acquire the scrambling code, code offset, and carrier frequency of the strongest base station when it has no radio link established to any particular base station. The mobile station then may measure the radio link quality of the neighboring cells to support various types of handover procedures. The mobile station then may estimate the delay profile to decide on allocation of Rake fingers or demodulator elements. In general, the searcher tests the hypothesis that a spread spectrum signal exists at a particular code offset and/or at a certain carrier frequency and/or with a certain scrambling code, and so on.

All of these requirements benefit from a high "search throughput" from the mobile station. The "search time" may also greatly impact performance during power up of the mobile device. A method for reducing the search time and increasing the search throughput is desirable.

BRIEF SUMMARY

The present disclosure is directed to communication systems, devices used in communication systems and associated methods that are generally directed to parallel hypothesis search techniques. The disclosed parallel hypothesis search techniques may permit a hypothesis to be dismissed early (i.e., before hypotheses in other searchers have completed their evaluation). Early hypothesis dismissal permits a new hypothesis to be loaded into the searcher while other searchers advantageously continue to evaluate their hypotheses.

In accordance with some embodiments, a communication device may include a receiver that receives a plurality of signals and a plurality of searchers coupled to the receiver. The searchers may receive a signal from the receiver and may decode the received signal. The device may also include a random access sequence generator coupled to the searchers. The random access sequence generator may cause each searcher to decode the received signal provided to the searcher using a code having a particular time offset. The time offset provided to a searcher may be independent of the time offsets of the codes provided to other searchers.

An exemplary method may include loading a hypothesis that has an associated code offset, accumulating an energy value based on a signal that has been decoded using the hypothesis to produce an accumulated energy value, comparing the accumulated energy value to a dump threshold, and if the accumulated energy value falls below the dump threshold, dismissing the hypothesis and loading a new hypothesis while other searchers continue to evaluate their hypotheses.

These and other embodiments are discussed below.

BRIEF DESCRIPTION OF THE DRAWINGS

For a detailed description of the preferred embodiments of the invention, reference will now be made to the accompanying drawings in which:

FIGS. 6A and 6B show exemplary frame structures;

FIG. 7 illustrates the operation of the pipeline architecture of the searcher of FIG. 5; and FIG. 8 shows an example associated with the pipeline architecture of FIG. 5.

NOTATION AND NOMENCLATURE

Certain terms are used throughout the following description and claims to refer to particular system components. As one skilled in the art will appreciate, different companies may refer to a component and sub-components by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either a direct or indirect connection. Thus, if a first device couples to a second device, that connection may be through a direct connection, or through an indirect connection via other devices and connections. As used herein, the terms "code offset" and "time offset" are synonymous. To the extent that any term is not specially defined in this specification, the intent is that the term is to be given its plain and ordinary meaning.

DETAILED DESCRIPTION OF PREFERRED EMBODIMENTS OF THE INVENTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
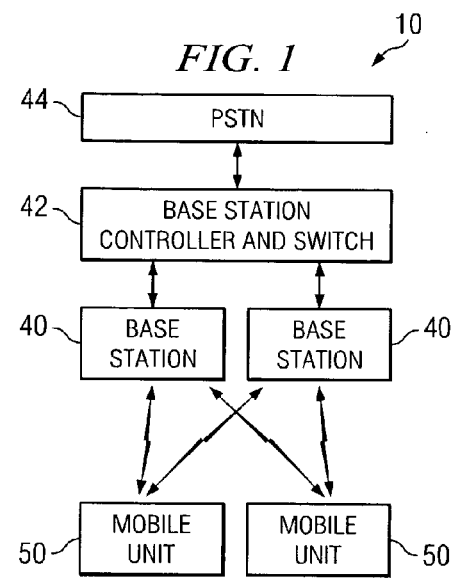
FIG. 1 shows a communication system in accordance with a preferred embodiment of the invention.

The preferred embodiments of the invention may be implemented in a wide variety of data transmission applications and FIG. 1 shows one possible application. In FIG. 1, system 10 may be useable for voice and/or data transmission. As shown, base station controller and switch 42 may perform interface and control functions to permit communications between remote units 50, base stations 40 and the public switched telephone network ("PSTN") 44. The remote units 50 may comprise mobile units such as cellular telephones and the like. In general, the base station controller and switch 42 controls the routing of calls between the PSTN 44 and base stations 40 for transmission to and from mobile units 50.

Figure 2:
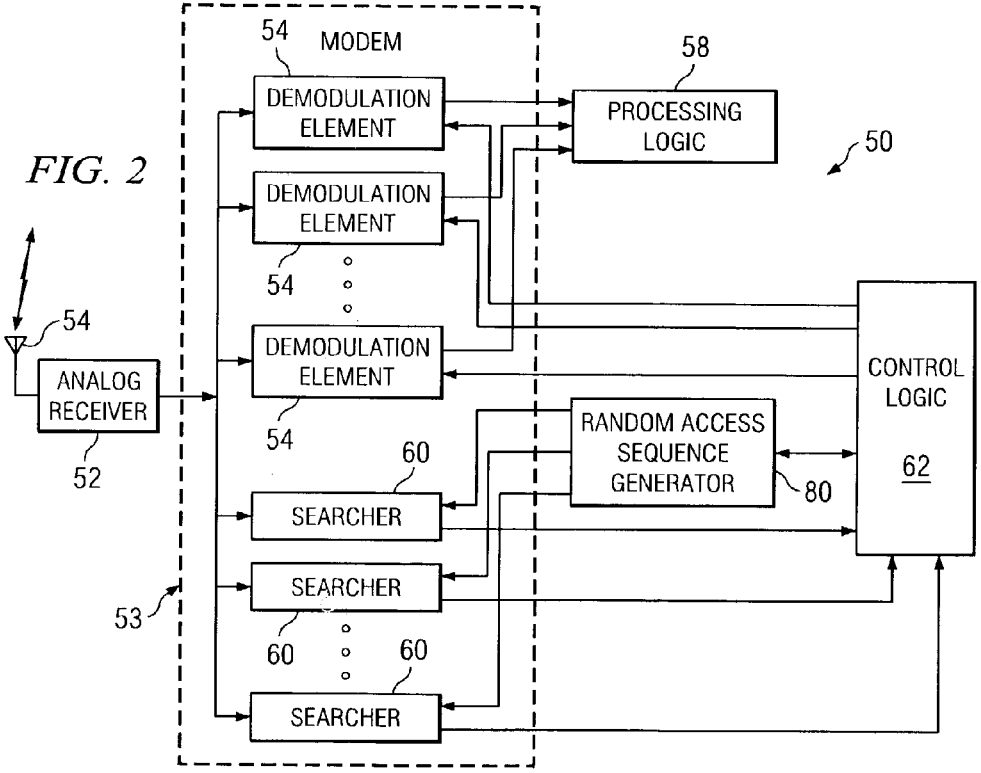
FIG. 2 shows a preferred embodiment of a communication device usable in the system of FIG. 1.

FIG. 2 shows a block diagram of at least a portion of mobile unit 50, although some or all of the components shown in FIG. 2 may also be included in the base stations 40. Thus, the principles described herein are applicable to either the mobile units 50 or the base stations 40. As shown in FIG. 2, mobile unit 50 may include an antenna 54, an analog receiver 52, a modem 53, processing logic 58, control logic 62, and a random access sequence generator 80.

The signals transmitted back and forth between the base stations 50 and the mobile units 40 may be encoded according to any of a variety of standards. In accordance with some embodiments, the applicable standard may be code division multiple access ("CDMA"). Reference may be made to any of a variety of documents for information pertaining to CDMA such as U.S. Pat. Nos. 6,542,478; 5,710,768; 5,642,377; 5,577,022; 5,440,597; U.S. Patent Application Publication Nos. US2003/00053518; US/2003002566, as well as various articles such as "A Generalized Search Rule Of Likelihood Ascent Search Detectors For CDMA Multiuser Detection" by Yi Sun, all of which are incorporated herein by reference.

In a CDMA network, information to be transmitted between a base station 50 and a mobile unit 40 is encoded with a scrambling code. The scrambling code may also be referred to as a pseudo noise ("PN") code. Signals transmitted by a base station 50 and detected by the antenna 54 may be received by the analog receiver 52. The analog receiver preferably down-converts the detected signal to a baseband equivalent signal, quantizes the received "I" and "Q" channels, and provides these digital signals to modem 53. In FIG. 2, the modem 53 may comprise one or more demodulation elements 54 and one or more searchers 60. Although any number of demodulation elements 54 and searchers 60 may be included, in accordance with the preferred embodiments of the invention, a plurality of demodulation elements 54 and a plurality of searchers 60 are included in the modem 53. Each modem 53 may support a single user and thus a base station 50 may include a plurality of modems 53 to support a plurality of simultaneous users if desired.

Each demodulation element 54 is responsible for decoding an incoming signal in accordance with a scrambling code offset that closely tracks the offset used to encode the data in the first place. In general, each searcher 60 decodes a test pilot signal transmitted by the base station 50 in accordance with a scrambling code offset as controlled by the control logic 62. The control logic 62 causes each searcher 60 to decode the pilot signal with a particular code offset value. The searcher 60 decodes the signal with the code offset and computes an energy level associated with the decode operation. The energy generally will be maximum when the code offset used in the decode process matches the code offset used in the encoding process. Each searcher 60 reports the energy that it determines with the designated offset to the control logic 62. The control logic 62 examines the energy results reported to it by the searchers 60 and determines which offset is most likely to be the offset used by the device that encoded and transmitted the pilot signal (e.g., the base stations). This process will be explained in more detail below. Once a suitable offset is determined by the coordinated effort of the searchers 60 and control logic 62, the control logic 62 then causes one or more demodulation elements 54 to be assigned using the determined offset to decode future signals from the transmitting device. Once a demodulation element 54 has locked onto the signal at its determined offset, the demodulation element then may track the signal on its own without supervision from control logic 62, until the signal fades away or until the demodulation element 54 is assigned to a new offset by control logic 62.

Figure 3:
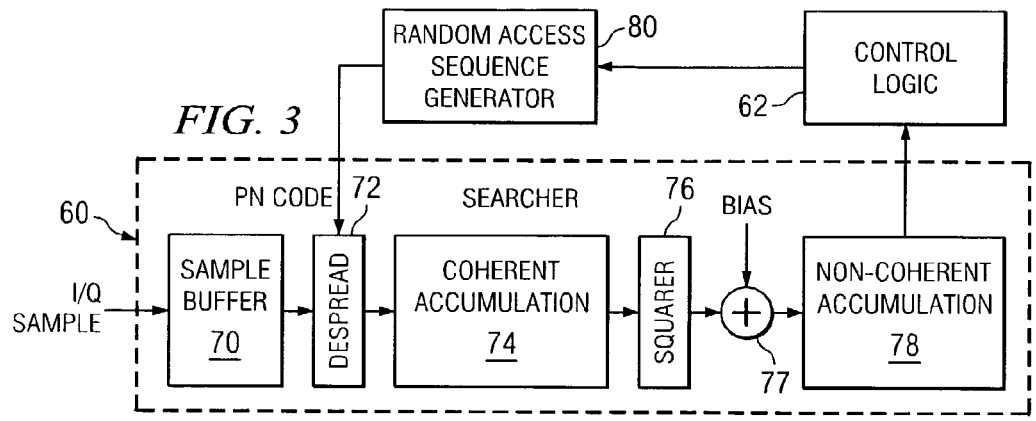
FIG. 3 shows a preferred embodiment of a searcher used in the communication device of FIG. 2.

FIG. 3 shows an exemplary embodiment of a searcher 60 coupled to the control logic 62 and random access generator 80. As shown in FIG. 3, the exemplary searcher 60 may include a sample buffer 70, despread 72, a coherent accumulator 74, a squarer 76, and a non-coherent accumulator 78. Other components may be included as well such as adder 77 which adds in a BIAS value. Input I/Q signals from the analog receiver 52 (FIG. 2) may be stored in sample buffer 70. From the sample buffer 70, the samples are processed by despread 72 which may comprise a quadrature or other suitable type of despread. The despread 72 generally correlates the sampled I/Q samples with a PN code provided by the random access sequence generator 80. The determination of the code offset associated with the PN code provided by the random access sequence generator 80 will be explained in more detail below.

The output from despread 72 is provided to the coherent accumulator 74 which accumulates the signal as is well known. The accumulator 74 output is squared by squarer 76 to compute an energy value which is then shifted by a BIAS value. This BIAS value is used in conjunction with the dump threshold (D) to determine the miss probability and average dwell time based on the target signal-to-noise (SNR) ratio. The energy value is then processed by non-coherent accumulator 78 which further accumulates the signal. The output values from the non-coherent accumulator 78 generally indicate an energy level and such energy values are analyzed by the control logic 62. In general, the correct PN code to use by a demodulation element 54 is the code that results in maximum energy. As explained previously, maximum energy results when the timing between the PN code and the I/Q sample is just right so as to be able to accurately decode the incoming signal.

In accordance with the preferred embodiments of the invention, the random access sequence generator 80 generally provides PN codes to be used in the despread operation in a searcher and are associated with time offsets that have little, if any, dependency to PN code time offsets provided to other searchers 60. That being the case, an offset hypothesis can be aborted if the hypothesis proves to be incorrect and a new hypothesis can be loaded in that searcher without having to wait on other searchers 60 in the modem 53 to determine the outcome of their hypotheses. That is, modem 53 includes a plurality of parallel searchers whose operation is not necessarily synchronized.

In accordance with at least some embodiments, the control logic 62 may generate a plurality of possible code offsets and load such code offsets into the random access sequence generator 80. The offsets may be loaded in a random order in a memory buffer in the random access sequence generator 80. "Random" includes pseudo-random and the like. As such, the random access sequence generator 80 may include a random access memory buffer and a controller (not specifically shown) that selects one of the code offsets to be loaded into a searcher 60. The selection of code offsets may be in a random order using a random number generator (not shown) or other suitable technique. The PN code(s) loaded in the random access sequence generator 80 may be computed or otherwise determined by the control logic 62. The PN code may be predetermined or determined in accordance with any of a variety of suitable techniques depending on the applicable communication standard. If stored in random order, the code offsets may be stored at various memory addressed in the random access sequence generator's buffer and retrieved in memory address to be provided to the searchers. Alternatively, the code offsets may be stored in offset order in the buffer and retrieved in a random order.

Figure 4:
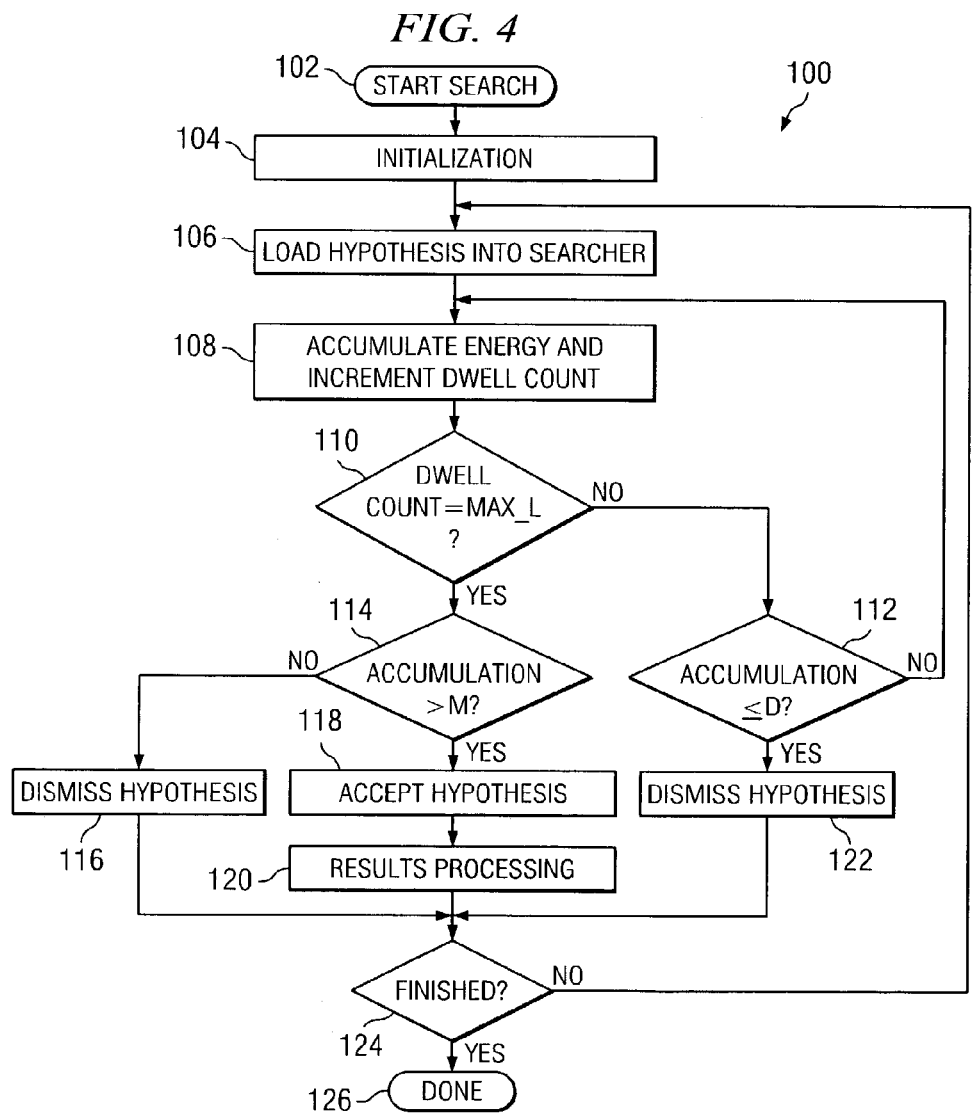
FIG. 4 depicts an exemplary process implemented in the searcher of FIG. 3.

FIG. 4 shows an exemplary process 100 for generating, testing and rejecting code offset hypotheses. Process 100 may start at 102 and initialize at 104. The initialization process 104 may include initializing one or more variables such as a dwell count and an accumulated energy value. Such variables may be initialized to a suitable starting value such as 0. At 106, a new hypothesis may be loaded into a searcher 60 by the random access sequence generator 80. The accumulation process begins in block 108 in which a present energy result from non-coherent accumulator 78 is added to a previous energy total. The dwell count comprises a value that indicates the number of accumulation steps that have been performed. The dwell count also is generally indicative of the amount of time for which the current hypothesis has been tested. If the dwell count has not yet reached a maximum threshold, designated as MAX_L, as determined by decision block 110, then decision block 112 may be performed. In accordance with decision block 112, the accumulated energy value is compared to a dump threshold (D). If the accumulated value is less than or equal to D, then the hypothesis loaded in block 106 is dismissed in accordance with block 122. Dismissing a hypothesis refers to rejecting the hypothesis as invalid. If, however, the accumulated energy value is not less than or equal to D, then process control may loop back to block 108 in which the accumulation process continues. Dump threshold D permits a new hypothesis to be tried while other hypotheses are still being tested.

If in decision block 110 it is determined that the dwell count equals MAX_L, control passes to decision block 114. In decision block 114 it is determined whether the accumulated value is greater than an acceptance threshold M. The acceptance threshold M in decision block 114 generally is a value that indicates whether the hypothesis should be dismissed or accepted. In accordance with at least some embodiments, the acceptance threshold M used in decision block 114 may be equal to, or a function of, (M-BIAS+1)*MAX_L. If the current accumulated value is greater than the acceptance threshold, the hypothesis is accepted in block 118 with the energy results being further processed in block 120. Processing in block 120 may include storing an ordered list per record of the eight strongest accepted hypotheses, sorted by earliest arriving time and by energy value. Other processing may include computing a pilot strength for each record by summing up the individual energy values of the eight strongest accepted hypotheses and reporting this pilot strength in both linear and dB form. If, however, in block 114 the current accumulated value is not greater than the acceptance threshold, the hypothesis is dismissed in block 116. The acceptance threshold thus may reduce the frequency of false positives. From blocks 116, 120 or 122, control may pass to block 124 in which it is determined whether the searching process is completed. This decision is made by checking to see if all eight hypothesis counters (1 per record) have all been decremented to zero. Each counter is decremented when a hypothesis completes its processing, either by being "dumped" or by being passed onto the result processor. If searching is finished, the process completes at 126. If not, control passes back to block 106.

As noted above, by implementing the threshold D, a hypothesis may be dismissed early on in the search process when it is determined that the hypothesis is likely not to be valid. Once dismissed, the random access sequence generator 80 can reload the searcher that dismissed its hypothesis while other searchers still may be processing their hypotheses. In being able to dismiss a hypothesis early, the searching processing can be made more efficient and thus faster.

Figure 5A:
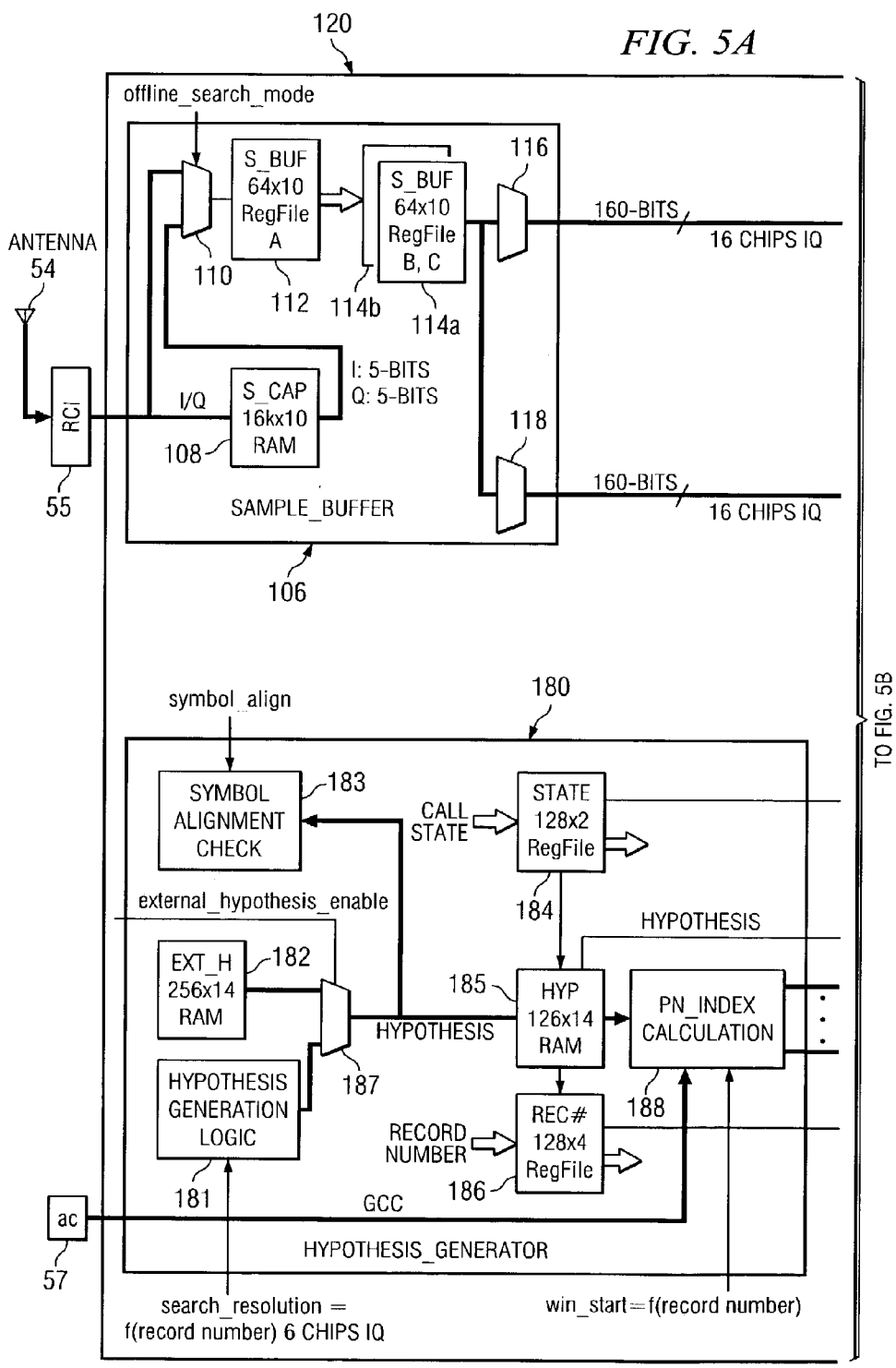
FIG. 5 shows another preferred embodiment of the searcher used in the communication device of FIG. 2.
Figure 5B:
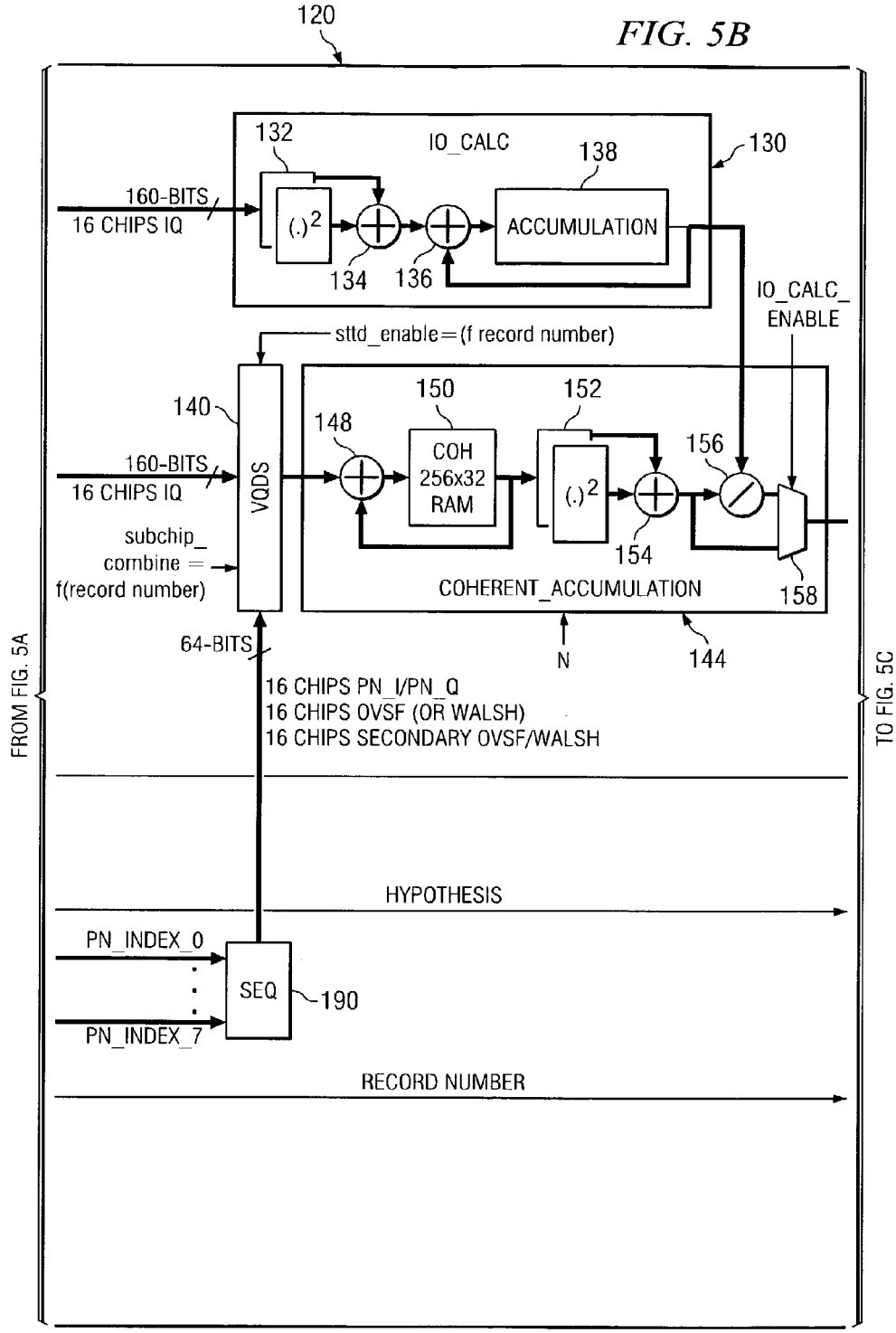
Figure 5C:
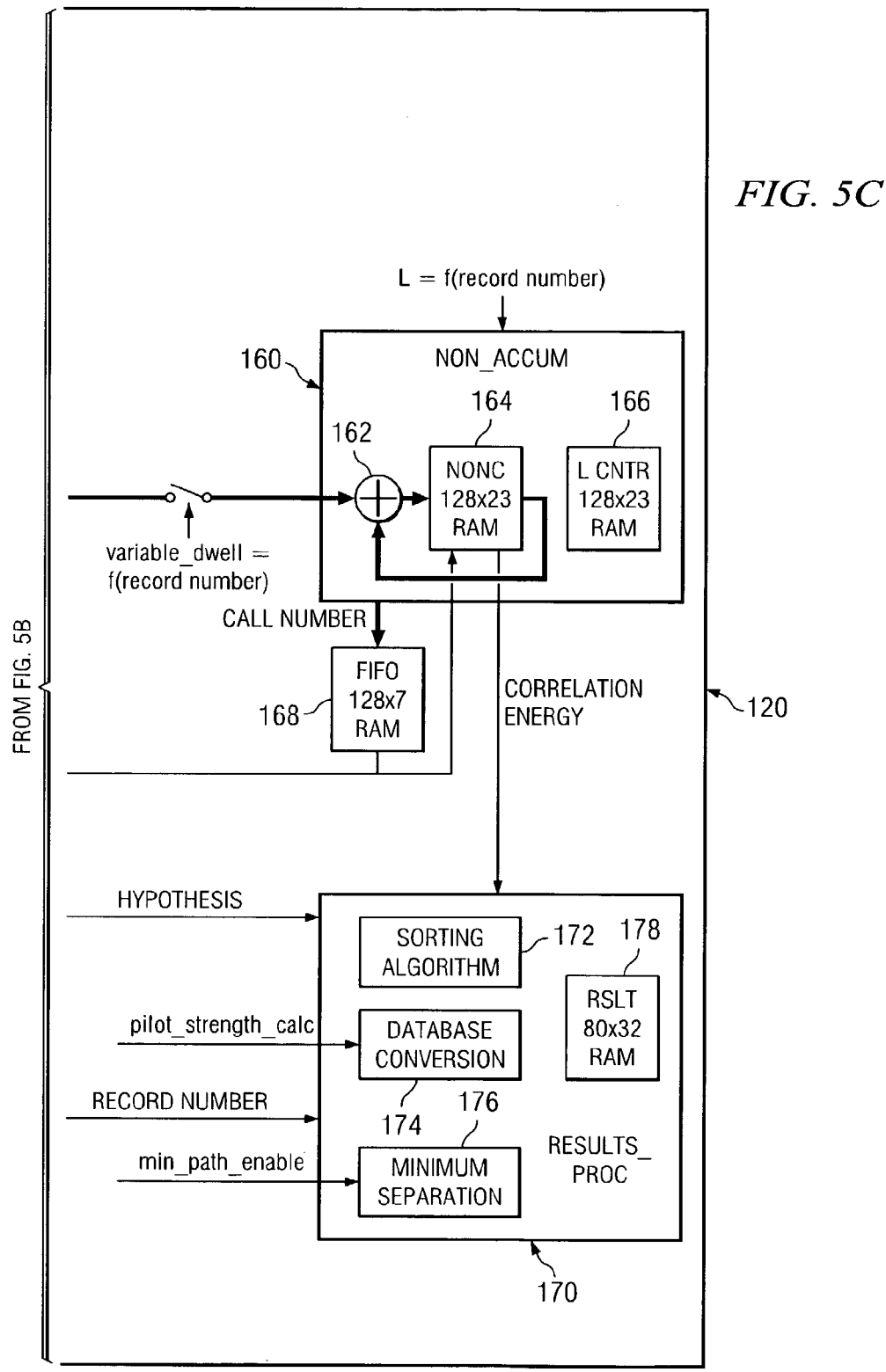

The following includes an example of the preceding embodiments. FIG. 5 shows a searcher 120 in accordance with a preferred embodiment of the invention. The following discussion of FIG. 5 is exemplary of the embodiment of the FIG. 5. Many aspects of FIG. 5 (e.g. numerical limitations on buffer sizes, chip numbers, etc.) may be varied as desired in other embodiments. The searcher 120 couples to an antenna 54 via a radio control interface ("RCI") 55. RCI 55 receives the antenna's signal and generates I/Q signals as explained previously. The searcher depicted in FIG. 5 may include a sample buffer unit 106, an I/O calculation unit 130, a vector quadrature despread ("VQDS") unit 140, a coherent accumulator 144, a non-coherent accumulator 160, a results processor 170, a hypothesis generator 180, and a sequence generator ("SEQ") 190.

By way of an overview, a system controller ("SC") 57 may provide a global chip count ("GCC") to the hypothesis generator 180. The GCC may serve as a timestamp for the I/Q samples stored in the sample buffer unit 106. The sample buffer unit 106 may store 32 "chips" of I/Q data and may be refreshed every 16 chips worth of time. In CDMA, the information data is a low-speed signal with a small bandwith in the range of 10-100 kbits/sec. The energy of this low-speed signal is spread over a much larger bandwidth by multiplying it by a known wideband spreading code. The bandwith of the resulting signal is approximately equal to the rate of the spreading code called the chip rate. Therefore a single chip refers to a portion or "chip" of the low-speed information data. The hypothesis generator 180 may generate test PN indices, which the SEQ 190 may use to generate sequences of PN_I, PN_Q and Orthogonal Variable Spreading Factor (OVSF) or Walsh codes which are well known. The I/Q samples from the sample buffer unit 106 along with the PN sequences from the SEQ 190 may be provided to the VQDS unit 140. The VQDS unit 140 generally performs two functions. One function is to recover a pilot channel from the incoming I/Q data stream using the OVSF/Walsh bits provided by the SEQ 190. The other function is to correlate the resulting data stream with PN_I and PN_Q values. In the coherent accumulator 144, the correlation results for I and Q may be maintained as two distinct data streams and may be accumulated independently for N chips, where N is the coherent dwell time. Upon expiration of this coherent dwell time N, the data stream for I and Q each may be squared and combined together into one data stream and accumulated in the non-coherent accumulator 160 for L chips, where L is a non-coherent dwell time. At the completion of the non-coherent dwell time L, correlation peaks (defined as those meeting a threshold criterion) are sent to the results processor 170. The results processor 170 preferably maintains a sorted list of peaks in terms of both strength and earliest arriving multipaths. The results processor 170 also may compute the pilot channel strength by summing the individual multipath peaks together. The computed pilot channel strength may be reported in absolute strength and in units of decibels ("dB").

The following discusses the embodiment of FIG. 5 in more detail. The function of the sample buffer unit 106 preferably is to store I/Q samples to be used in the correlation process. The sample buffer unit 106 depicted in FIG. 5 may include three sample buffer register files 112, 114a, and 114b, multiplexers 110, 116, 118, and memory 108. Register files 114a,b combined may provide 32 chips worth of I/Q data storage at ¼ chip resolution. Each I and Q sample may be 5 bits wide. These 32 chips of I/Q data in register files 114a,b may be provided in a parallel fashion to the I/O calculation unit 130 and VQDS 140 through multiplexers 116 and 118, respectively. The I/O calculation unit 130 and VQDS 140 may select 16 out of the possible 2 chips of I/Q data to use in the correlation process. Sample buffer register file 112 may be filled with the next 16 chips of I/Q data in a serial fashion while the correlations are being performed on the data from register files 114a,b. When register file 112 becomes full, I/Q data may be transferred from register file 114a to register file 114b and from register file 112 to register file 114a, preferably in one clock cycle. In this way, register files 114a,b preferably always contain the current 32 chips worth of I/Q data while register file 112 collects the next 16 chips of data from the RCI 55. The sample buffer unit 106 may also include memory 108 which may comprise a 16 k×10 random access memory ("RAM") in which sample capture I/Q samples can be stored. The memory 108 may used in a low power offline search mode in which 3.2 slots worth of I/Q samples at ½ chip resolution may be stored. Correlations then may be performed on this data in memory 108 with the analog and RF front end turned off.

The hypothesis generator 180 may include hypothesis generation logic 181, external RAM 182, symbol alignment check 183, register files 184 and 186, hypothesis RAM 185, multiplexer 187 and PN_index calculation unit 188. Other components may be included as well. The hypothesis generator 180 may generate test PN indices that the SEQ 190 may use to generate PN sequences against which to correlate. The locations of the PN indices may be specified in "PN space." Preferably, the PN space is periodic (e.g., every 10 ms for WCDMA and every 26.67 ms for CDMA2000). Each PN index may be computed according to a suitable formula such as PN_INDEX=GCC−(window_start+hypothesis), where GCC is the timestamp from the SC 57 of each I/Q sample. The window_start value is explained below. Alternatively stated, each PN_INDEX may be a location in the PN space relative to the timestamp of each IQ sample that is used in the correlation process.

In some embodiments, the hypothesis generator 180 may compute a new hypothesis according to the following: hypothesis=previous_hypoth+search_resolution. In this way, two consecutive hypotheses may only differ by the search resolution value. The search resolution may be set to any suitable value such as 1 chip, ½ chip or ¼ chip.

A window_start value may point to any location in the PN space, while each hypothesis may only point to locations within a "slot". At, for example, a 3.84 Mchips/sec chip rate, a 10 ms frame corresponds to 38,400 chips. Each 10 ms frame is comprised of 15 equal slots or 2560 chips. The number of hypotheses and the resolution between adjacent hypotheses may define the search window size. Each hypothesis may be of any suitable width. In some embodiments, the hypothesis may be 14 bits wide—12 bits to indicate the chip within a slot and 2 bits to indicate the sub-chip (either 0, ½, ¼, or ¾) within a chip over which to correlate.

The searcher 120 may include 128 independent correlation resources. Each hypothesis may consume one correlation resource. For this reason, a 128×14 hypothesis memory 185 may store each of the 128 active hypotheses in the searcher 120. If the number of hypotheses exceeds 128 for a given search, the hypothesis generator 180 may generate the first 128 hypotheses and may wait for the searcher to complete its correlations against this first set of 128 hypotheses. As correlations complete and resources become available, the hypothesis generator 180 may generate the remaining hypotheses. This process may continue until all hypotheses are searched or correlated.

The searcher hypothesis generator 180 may support hypothesis and PN_INDEX generation for, for example, WCDMA and CDMA2000. PN indices for WCDMA and CDMA2000 may wrap around at different points because of the differing frame structures of WCDMA versus CDMA2000. The frame structure for each such standard is shown in FIGS. 6A and 6B. FIG. 6A shows the frame structure for WCDMA and FIG. 6B shows the frame structure for CDMA2000. For WCDMA (FIG. 6A), each frame preferably comprises 15 slots at 2560 chips per slot. At a transmission rate of 3.84 Mchips/sec, each frame may be transmitted in 10 ms. For CDMA200 (FIG. 6B), each frame preferably comprises 32768 chips. At a transmission rate of 1.2288 Mchips/sec, each frame may be transmitted in 26.67 ms. A software controlled configuration register (not specifically shown) may be used to specify in which mode the searcher functions. Preferably, the PN indices generated by the hypothesis generator 180 and provided to the SEQ 190 are between 0 and 38399 for WCDMA and between 0 and 32767 for CDMA2000, although in other embodiments these numbers may vary.

As explained previously, any two hypotheses generated by the hypothesis generator 180 may differ by the amount of the search resolution. In other embodiments, the difference between two hypotheses may not be a constant and thus may bear no particular pattern. The external RAM 182 is thus used to permit discontinuous hypotheses to be programmed and searched.

In a symbol alignment mode, the hypothesis generator 180 may perform an additional check after generating a hypothesis and computing the associated PN_INDEX. Specifically, the hypothesis generator may check to see if the PN_INDEX generated with the current hypothesis is on a symbol boundary. This may help to ensure that correlations begin on a symbol boundary as opposed to spanning a symbol, resulting in increased correlation performance.

To check for symbol alignment, the hypothesis generator 180 may test the calculated PN_INDEX to see if it is a multiple of N, the coherent dwell time. When a PN_INDEX is a multiple of the coherent dwell time N, it is also a multiple of the symbol length. If this conditional check is true, then the hypothesis is assigned to that cell as normal. If, however, the conditional check fails, then the hypothesis generator 180 may stall and wait for this condition to become true for a future cell, at which point the hypothesis may be assigned to that cell. This condition will become true as the timestamp (i.e. GCC relative to which each PN_INDEX is calculated) progresses in time.

The SEQ 190 may receive a PN index from the hypothesis generator 180 and a request pair generated by the hypothesis generator. The SEQ 190 preferably computes the PN sequences that correspond to each PN index. In at least some embodiments a 1:1 mapping (defined by the 3GPP2 Specification) may exist between each PN index and the corresponding PN_I, PN_Q, and OVSF/Walsh sequences.

For every PN index that the hypothesis generator 180 sends to the SEQ 190, the SEQ may return 16 consecutive chips worth of PN_I, 16 consecutive chips worth of PN_Q, 16 consecutive chips worth of OVSF bits and 16 consecutive chips worth of Secondary OVSF bits. In some embodiments, the hypothesis generator 180 may send as many as 8 PN index/request pairs to the SEQ 190 per chip time yielding up to 128 bits each of PN_I, PN_Q, OVSF and Secondary OVSF per chip from the SEQ.

The searcher 120 may use the 16 chips of PN from the SEQ 190 and the 16 chips of I/Q samples from the sample buffer unit 106 to perform a 16-bit vector despread/correlation every clock cycle. This 16-bit vector processing offers the advantage (over traditional 1-bit per clock cycle despread/correlation operations) of lower hardware latency (i.e. faster search times). The following outlines the 16-bit vectorized quadrature despread performed by VQDS 140 between I/Q samples and PN_I and PN_Q:

I Stream: $(I \times PN\_I + Q \times PN\_Q)_{chip0} + (I \times PN\_I + Q \times PN\_Q)_{chip1} + \ldots + (I \times PN\_I + Q \times PN\_Q)_{chip15}$ Q Stream: $(Q \times PN\_I - I \times PN\_Q)_{chip0} + (Q \times PN\_I - I \times PN\_Q)_{chip1} + \ldots + (Q \times PN\_I - I \times PN\_Q)_{chip15}$ The searcher 120 may also be capable of performing the above 16-bit vectorized quadrature despread on two different phases of I/Q samples. This is possible because the sample buffer unit may store I/Q samples down to ¼ chip resolution (i.e. four I/Q samples per chip). In this mode, the searcher can perform up to 256 PN correlations per chip. When using just one phase of I/Q samples, the searcher may perform up to 128 PN correlations per chip.

As is generally known, the samples comprises phases "X" and "Y." At least one use of the second phase (or phase "Y") is for "subchip_combining." In this mode, two different phases of the same I/Q data may be used to perform correlations. For example, if the search resolution is programmed to 1 chip, phase X may correlate using I/Q samples at chip 0, chip 1, chip 2, etc. Phase Y, however, may correlate using I/Q samples at ½ chip, 1½ chip, 2½ chip, and so on. The searcher 120 accumulates the despread data for phase Y of I and Q independently in the coherent accumulation RAM 150 preferably much like it does for phase X. For this reason, the coherent accumulation RAM preferably is 256× 32, as opposed to 128×32, so that each cell may obtain two address locations in the RAM—one for phase X and one for phase Y.

Phase Y preferably is a function of phase X. More specifically, phase Y may be one-half of phase X or the search resolution. This may be true for search resolutions of 1 chip and ½ chip, where phase Y would be at ½ chip and ¼ chip resolution, respectively. However, for search resolutions of ¼ chip, subchip combining may not be usable because this would require phase Y to be at ⅛ chip resolution, which is beyond the above noted resolution with which the searcher captures I/Q samples. Of course, the chip resolution may be varied as desired in various embodiments.

Another usage of the phase Y VQDS result is for space time transmit diversity ("STTD") mode. In STTD mode, the same I/Q sample is used for both phase X and phase Y (unlike the subchip combining mode described above). In the STTD mode, the VQDS module decodes phase Y using the Secondary OVSF/Walsh bits from the SEQ 190. All search resolutions (e.g., 1 chip, ½ chip and ¼ chip) preferably are supported in the STTD mode.

Correlation results from the VQDS 140 for both I and Q data and for both phases X and Y may be accumulated in the coherent accumulation module 144. This module may include adders 148, 154 coherent RAM 150, squarer 152, divider 156 and multiplexer 158. Coherent RAM 150 preferably comprises a memory buffer organized as 256×32 as explained previously. RAM 150 may be used to store accumulation results for each of the 128 active hypotheses for both phases X and Y. The term 'coherent' is used since the datapaths for I and Q data are accumulated as independent streams.

The coherent accumulation time may be designated as "N" and generally comprises the number of chips over which the accumulation occurs). The accumulation time N may be specified via software or other suitable mechanisms. At the completion of the coherent accumulation, the accumulation result for each hypothesis may scaled by N by right shifting. When phase Y is enabled, the energy values from phases X and Y preferably are summed together.

Referring still to FIG. 5, the non-coherent accumulator 160 may include a summer 162, non-coherent RAM 164 and an additional buffer 166 as shown. In general, the non-coherent accumulator 160 may combine the I and Q data streams into a single stream and accumulate such a stream for a period of time. Preferably, the I and Q data streams are combined non-coherently by computing the sum $I^2+Q^2$ which may be accumulated for L times (the non-coherent accumulation time). RAM buffer 166 may be organized as 128×23 and may serve as the non-coherent accumulator for each of the 128 active hypotheses.

At the completion of the non-coherent accumulation time, the resulting non-coherent accumulation energy is compared to a predetermined threshold to determine the validity of the correlation peak. If the correlation energy for a given hypothesis meets the multipath threshold criterion, the correlation resource number (a number between 0 and 127) for that hypothesis preferably is provided to the results processor 170. Because the results processor processes asynchronously to the coherent and non-coherent accumulators 144 and 160, a buffer 168 serves as the communication interface between the non-coherent accumulator 160 and the results processor 170. The buffer 168 may be organized in any suitable manner such as a 128×7 first in-first out ("FIFO") buffer. The data into the FIFO buffer 168 from the non-coherent accumulator 160 may be the 7-bit correlation resource number of the hypothesis that meets the multipath threshold criterion. If the correlation energy for a given hypothesis does not meet the multipath threshold criterion, that correlation resource is freed up for additional hypotheses that are waiting to be processed.

The total accumulation time for each hypothesis may be N*L chips as each hypothesis is coherently accumulated for N chips and then non-coherently accumulated L times. Thus, N*L chips of time may elapse before the correlation energy for a given hypothesis is compared to the multipath threshold criterion. This may be true regardless of whether or not a hypothesis turns out to be a valid or not.

Variable dwell is a feature that allows hypotheses that are "not on track" to meeting the multipath threshold criterion to be discarded early in the hypothesis testing process. As such and as explained previously, correlation resources may be reallocated for new hypotheses to begin processing earlier than such hypotheses otherwise would have been processed. This is achieved by comparing the intermediate correlation energy to a dump threshold for each hypothesis after every coherent accumulation is completed. For example, if N=16 (i.e., 256 chips) and L=16, then the correlation energy for each hypothesis is compared to the multipath threshold after N*L or 256*16 (4096) chips of time. In variable dwell mode however, the intermediate correlation energy for each hypothesis is compared to a dump threshold and possibly dumped after every 256 chips of time (i.e. when L=1, L=2 ... L=16).

Referring still to FIG. 5, results processor 170 may include a sorting process 172, a dB conversion process 174, a minimum separation process 176, and memory 178. The processes 172, 174, and 176 may implemented as firmware stored in memory and executed by a processor (not specifically shows). When a correlation resource number is put into the FIFO 168 by the non-coherent accumulator 160, the results processor may read the resource number from the FIFO 168 and use the resource number as an address into the hypothesis memory 185 and the non-coherent accumulation memory 164. Once the results processor 170 has read the hypothesis and the correlation energy from the hypothesis memory 185 and non-coherent accumulation memory 164, respectively, the correlation resource may be released for a new hypothesis to begin processing.

The purpose of the results processor 170 generally is to report correlation results back to the host system (i.e. the communication device in which the searcher resides) in a useful format. This may eliminate the need of having the host system's processor expend processing resources to manipulate or translate the correlation results in software. As such, the results processor 170 may maintain a list of a predetermined number (e.g., eight) strongest hypotheses sorted by both strength and earliest arriving time (i.e. smallest to largest hypotheses).

A composite Pilot Channel signal strength also may be computed by the results processor 170 summing up the eight (or different number) strongest hypotheses. This composite Pilot Channel strength may be reported in both magnitude and dB.

Since the hypotheses may have resolution down to ¼ chip resolution, the list of eight hypotheses in the results processor may also be in accordance with ¼ chip resolution. However, a minimum_multipath_separation feature may be enabled in the results processor 170. The minimum_multipath_separation feature ensures, or helps to ensure, that each of the eight hypotheses reported by the results processor 170 to the host system will be separated by at least a predetermined amount. For example, assume hypothesis (or correlation peak) 'A' is at 5½ chips, hypothesis (or correlation peak) 'B' is at 5¾ chips and the minimum_multipath_separation specified by is ½ chips. In this case, only correlation peak 'A' would be stored in the results processor 170 and reported to the host system because peak 'B' is only ¼ chips away from peak 'A' while the software specified minimum distance between two adjacent correlation peaks is ½ chips. This provides a mechanism for reporting only distinct correlation peaks from the searcher 120 to the host system in which the searcher resides.

The searcher 120 may have the capability to compute the raw total energy of I/Q samples stored in the sample buffer unit 106. This allows the searcher 120 to measure its correlation peaks relative to the total signal energy received by the antenna 54. The total energy, designated as "I0," may be computed in I0 calculation 130 by calculating $I^2+Q^2$ using I/Q samples from the sample buffer unit 106. Since the I/Q samples in the sample buffer unit may be refreshed every 16 chips, I0 may be re-computed every 16 chips and accumulated over the coherent dwell time (i.e., N chips). This may permit the correlation results from the VQDS 140 and coherent accumulator 144 to be normalized by I0 at the completion of each coherent dwell time.

The searcher 120 may perform correlations between PN sequences from the SEQ 190 and IQ samples stored internally in the sample buffer unit 106 over a search window. The search window may be determined by specifying a window_start position, the number of hypotheses over which to search and the search resolution. The correlation results may be accumulated over a period of time and only those accumulation results adhering to a multipath threshold are provided to the results processor 170. After all correlations over the specified search window are complete, the results processor 170 may return the eight strongest hypotheses or multipaths to the host system's process via an interrupt or other suitable mechanism.

Batch processing enables the searcher 120 to perform correlations over eight different search windows, terminating in a single interrupt to the host system's processor. Each search window may be specified through the use of search records stored in the searcher 120. There may be eight search records (or other number) in the searcher 120. Any one of the possible 64 combinations of search records may be specified via a search record mask. To program different search windows, eight different window_start positions, eight different numbers of hypotheses and eight different search resolutions may be specified. In this example, the results processor 170 may store the eight strongest hypotheses or multipaths per search record. Without limitation, the benefit of such batch processing is to effectively allow eight different searches to proceed autonomously with minimal host system intervention.

As explained above, in at least one embodiment the searcher 120 may perform up to 128 PN correlations per chips (although that number may be varied) using one phase of I/Q samples or 256 PN correlations per chip using two phases of I/Q samples. There may be 128 correlation resources (also called "cells"). Each cell may include 16 parallel PN correlators in the searcher performed in one clock cycle. Each of the 16 PN correlators may be of the form:

I Stream: (I×PN_I+Q×PN_Q)

Q Stream: (Q×PN_I−I×PN_Q)

where I and Q are each 5-bits and PN_I and PN_Q are each 1-bit wide.

Each of the 16 parallel PN correlators may be time-shared eight times per chip, (i.e., eight cells may be processed per chip) yielding 128 PN correlations per chip using one phase of I/Q samples. In the case in which two phases of I/Q samples are used, each of the eight cells may be processed over two clock cycles (one for each I/Q phase), resulting in 256 PN correlations per chip. Accordingly, the searcher 120 may require 16 clock cycles per chip time which means the searcher is run at 16 times the chip rate). For UMTS-compliant systems, this equates to 16*3.84 MHz or 61.44 MHz, while for CDMA2000 systems, this equates to 16*1.2288 MHz or 19.6608 MHz.

The correlation hardware in the searcher may be pipelined over a suitable number of pipe stages. In the example discussed herein, there are four pipe states and each stage is 16 clock cycles (or 1 chip) long. A different number of stages may be implemented as well as the length of each stage. This 64-cycle latency excludes the processing performed by the results processor 170. Because there are eight cells being processed per 16 clock cycles as discussed above, 32 cells may be present in the pipeline at any given time. A 7-bit binary counter (i.e. sequentially counts from 0 to 127) may be used to determine which cell enters the 4-stage pipeline.

Therefore, when cell numbers 0 through 7 are in pipe stage 3, cell numbers 24 through 31 are being processed in pipe stage 0.

FIG. 7 illustrates the operation of the pipeline architecture. FIG. 7 shows the four pipe stages which are designated as pipe stage 0 through 3. Cells generally flow through the pipeline from pipe stage 0 to pipe stage 3. The function of each pipe stage is described below.

In pipe 0 hypotheses may be generated for all search records and assigned to the various cells. This assignment takes place via writes to the hypothesis memory 185 (which preferably comprises dual port memory) and writes to the record number register file 186. All hypotheses (newly assigned and previously assigned) may also read in pipe 0 for the purposes of calculating a PN index. These PN indices also may be sent to the SEQ 190 in this pipe stage.

Because the 32 cells in the 64-cycle pipeline are operating on up to eight independent search records, the record number register file 186 may store the mapping between cells and search record number. This mapping may allow cells downstream from pipe 0 to use the correct set of input search parameters.

As many as eight parallel requests (1 per cell) may be made in pipe 1 to the SEQ 190. The SEQ 190 may process these requests at a rate of 1 request per clock cycle plus 3 overhead cycles for a total of 11 cycles for all eight requests to be processed.

In pipe 2 the PN bits that are received from the SEQ 190 may be registered in the searcher 120 and used by the VQDS 140 as described previously. The 32-chips of I/Q data and the PN_I/PN_Q values from the SEQ 190 may be used in the despread process. The accumulation into the coherent accumulator memory 150 (which preferably comprises dual port memory) also may be performed in this pipe stage. Because two phases of I/Q samples can be correlated using the same PN bits from the SEQ 190, there may be two correlation results per cell. Accordingly, coherent accumulator memory 150 may be sized accordingly and may be comprise dual port memory. The 16 most significant bits of the 32-bit datapath may be used to store the coherent accumulation results for the I-stream, while the 16 least significant bits may be used to store the coherent accumulation results for the Q-stream.

At the completion of a coherent accumulation cycle, the two I/Q data streams for a given cell both may be scaled by N, the coherent dwell time. The value N may be common to all search records and may be implemented via a suitable counter. The two I/Q streams may each be squared and summed together and provided to the con-coherent accumulator in pipe stage 3. In variable dwell mode (which is a function of the search record), the combined data stream preferably meets a dump_threshold before advancing to the non-coherent accumulation process in pipe stage 3.

If the I0 calculation unit 130 has been enabled, the combined data stream may be divided by the I0 result before advancing to the non-coherent accumulation process. The division by I0 is implemented via a look-up table (not specifically shown).

In pipe 3 the accumulation into the two-port non-coherent accumulation memory 164 may be performed. The non-coherent accumulation process may continue for L times, the non-coherent dwell time. The value L may be a function of a search record, allowing each of the eight search records to perform searches of eight independent total dwell times. The total dwell time for a cell may be N*L chips of time. At the completion of the non-coherent dwell time, the correlation energy for a given cell may be scaled by L and compared to a multipath_threshold. If the multipath_threshold criterion is met, the cell number of this cell may be written to the FIFO 168.

In the example of FIG. 8, N is 2 and L is 3. With N equal to 2, there are 16×2 or 32 chips. Therefore, the total search or dwell time is 32×3 or 96 chips long. The four overlapping entities represent each of the four pipe stages while the numbers represent which cell is being processed in each pipe stage. In the example of FIG. 8, the non-coherent accumulation memory 164 may be written three times for each of the 128 correlation cells. Further, the coherent accumulation memory 150 may be written six times for each of the 128 correlation cells, where, for N=2), every two writes may begin a new coherent accumulation cycle.

The correlation hardware (i.e., coherent accumulator 144 and non-coherent accumulator 160) and the results processor 170 preferably run independently from each other and communicate via FIFO 168 as explained previously. Any time FIFO 168 is not empty, the results processor 170 may perform a read from the FIFO to establish which of the 128 cells has just completed its correlations. The results processor 170 may use that cell number as an address into the hypothesis memory 185, the non-coherent accumulation memory 164 and the record number register file 186 to simultaneously read the hypothesis, the correlation energy and the search record number, respectively, of the cell whose number was stored in the FIFO 168. Once each of these three quantities have been read by the results processor 170, if more hypotheses exist to be processed, the hypothesis generator 180 preferably overwrites the hypothesis memory 185 with a new hypothesis at the address corresponding to this cell.

The results processor 170 may take the hypothesis, correlation energy, and search record number and preferably tracks the eight strongest correlation energies per search record for all eight search records. This list of eight peaks may be sorted by correlation energy as well as by increasing hypothesis. If enabled, the results processor also may ensure that the hypotheses corresponding to the eight strongest correlation energies are separated by a predetermined minimum amount. The result processor 170 also may compute a pilot channel strength by summing the eight strongest correlation energies on a per record basis. The pilot channel strength also may be converted to units of dB by the results processor's dB conversion process 174. The dB calculation is implemented via look-up tables or other suitable techniques. The results processor 170 may reports its results via results memory 178. Results memory 178 preferably comprise a suitably sized dual port memory such as a 80×32 dual port RAM. One port of the dual port memory 178 may be used for writing the results and the other port may be dedicated to a host processor (not shown) for read accesses.

Each cell implemented in the searcher 120 may have an assigned state. In accordance with the preferred embodiments, the possible states of the cells may include "idle," "accum" or "in_fifo." The "idle" state preferably means that no hypothesis has been assigned to that cell. A cell in the idle state also means that the cell is a correlation resource available for use. A cell may be in the idle state at various times such as at the beginning of a search or as particular cells complete their coherent and non-coherent accumulations.

The "accum" state preferably means that a hypothesis has been assigned to that cell and that PN correlations are currently in progress for that cell's hypothesis. When the hypothesis generator 180 determines that a cell is in the "accum" state in pipe 0, the hypothesis generator generally cannot write to the hypothesis memory 185 at that cell's address location because an active hypothesis already exists for that cell. However, when a cell is in "accum" state, the hypothesis generator 180 may read from the hypothesis memory 185 at that cell's address location, compute a PN index and provide that index to the SEQ 190.

The length of time a cell remains in the "accum" state may be a function of the values of N and L. N may be implemented via, for example, an 8-bit counter and may be decremented every 16 chips of time. L may be implemented via a 128×7 dual-port RAM since L is a function of the search record and each of the 128 cells may be operating on any one of the eight search records. L may be decremented for a given cell when N is zero. When both N and L are zero for a particular cell, the accumulation time for that cell is complete.

The "in_FIFO" state means that the PN correlations for that cell are complete, the final correlation energy has met the multipath threshold criterion and the cell or resource number has been written into the results processor interface FIFO 168. As explained previously, once the results processor 170 reads the hypothesis, correlation energy and record number of the completed cell, the cell is released for processing a new hypothesis by changing that cell's state from "in_FIFO" to "idle."

Typically, the progression of cell states is from "idle" to "accum" in pipe 0, from "accum" to "in_FIFO" in pipe 3 and from "in_FIFO" to "idle" in any pipe stage, since this is a function of the results processor, which runs asynchronously to the correlation units. In variable dwell mode, however, cell states may transition from the "accum" state to the "idle" in pipe 2. Further, each cell's correlation result may be compared to a dump threshold at the end of each coherent dwell time. A given batch search may be considered complete when all cells transition back to the "idle" state.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A communication device, comprising:
   a receiver that receives a plurality of signals;
   a plurality of searchers coupled to said receiver, said searchers receive a signal from said receiver and decode said received signal;
   a random access sequence generator coupled to said searchers, said random access sequence generator providing a hypothesis for each searcher to test against the received signal;
   wherein the hypothesis provided to a searcher is independent of the hypothesis provided to other searchers; and
   wherein at the searchers an energy accumulation of the received signal is repeatedly compared against a first threshold prior to a maximum limit; and the energy accumulation of the received signal is compared against a second threshold after the maximum limit is reached; whereby a dwell count (duration) of a test varies by increments up to a maximum limit of increments; and
   wherein the energy accumulation of the received signal plus a BIAS based on a target SNR (signal-to-noise), together, are repeatedly compared against the first threshold.

2. The communication device of claim 1 further including control logic coupled to said searchers, said control logic dismisses a hypothesis where an accumulation of the received signal is below a threshold and provides a different hypothesis to the searcher independent of the operation of the other searchers.

3. The communication device of claim 1 wherein said random access sequence generator includes a memory buffer in which a plurality of hypotheses are stored.

4. The communication device of claim 3 wherein said hypotheses are selected at random from said memory buffer to provide to said searchers.

5. The communication device of claim 3 wherein said hypotheses are stored in a random order in said memory buffer at various memory addresses and selected in memory address order to provide to said searchers.

6. The communication device of claim 1 wherein the communication device comprises a wireless device.

7. A communication device, comprising:
   a receiver that receives a plurality of signals;
   a plurality of searchers coupled to said receiver, said searchers receive a signal from said receiver and decode said received signal; and
   wherein each searcher is loaded with a hypothesis to test against the received signal and wherein an accumulated energy of the received signal is repeatedly compared against a first threshold up until a maximum of a dwell count (duration), so that the dwell count varies; and the accumulated energy is compared against a second threshold after the maximum of the dwell count is reached; and
   wherein the energy accumulation of the received signal plus a BIAS based on a target SNR (signal-to-noise), together, are repeatedly compared against the first threshold.

8. The communication device of claim 7 further including control logic coupled to said searchers, said control logic dismisses a hypothesis where an accumulated energy is below a threshold and provides a different hypothesis to the searcher independent of the operation of the other searchers.

9. The communication device of claim 7 further includes a means for selecting random hypotheses to provide to said searchers.

10. The communication device of claim 7 further includes a means for storing said hypotheses in a random order and for selecting said hypotheses so stored in an order different from that in which the hypotheses were stored.

11. A system, comprising:
    a device that wirelessly communicates, said device including:
       a receiver that receives a plurality of signals;
       a plurality of searchers coupled to said receiver, said searchers receive a signal from said receiver and decode said received signal; and
       a random access sequence generator coupled to said searchers, said random access sequence generator providing a hypothesis to each searcher to test against the received signal;
       wherein at the searchers a dwell count (duration) of a test varies by increments up to a maximum limit of increments; and
       an energy accumulation of the received signal is repeatedly compared against a first threshold prior to the maximum limit and the energy accumulation of the received signal is compared against a second threshold after the maximum limit is reached; and wherein the energy accumulation of the received signal plus a BIAS based on a target SNR (signal-to-noise), together, are repeatedly compared against the first threshold.

12. The system of claim 11 wherein said device includes control logic coupled to said searchers, said control logic dismisses a hypothesis where an accumulation of the received signal is below a threshold and provides a different hypothesis to the searcher independent of the operation of the other searchers.

13. The communication device of claim 11 further comprising a memory buffer wherein said hypotheses are stored in a random order in said memory buffer at various memory addresses and selected in memory address order to provide to said searchers.

14. A modem usable in a communication device, comprising:
  a receiver;
  a plurality of demodulation elements coupled to said receiver;
  a plurality of parallel searchers also coupled to said receiver;
  a random access sequence generator coupled to said searchers, said random access sequence generator provides hypotheses for each of said searchers; and
  control logic coupled to said searchers; wherein each searcher accumulates an energy value based on a received signal and repeatedly compares said accumulated energy value to a dump threshold up to a maximum limit of a dwell count (duration) so that the dwell count varies; and said accumulated energy value is compared to a second threshold after the maximum limit is reached; and
  if said accumulated energy value falls below the dump threshold, said control logic dismisses said hypothesis and another a new hypothesis is loaded into the searcher while other searchers continue to evaluate their hypotheses; and
  wherein the energy accumulation of the received signal plus a BIAS based on a target SNR (signal-to-noise), together, are repeatedly compared against the dump threshold.

15. The modem of claim 14 wherein said random access sequence generator provides a hypothesis for a searcher that is independent of the hypotheses loaded in other searchers.

16. The modem of claim 14 wherein said hypothesis includes a code offset usable to decode the signal.

17. A method of determining a scrambling code to use in a wireless communication system having a plurality of parallel searchers, comprising:
  loading a hypothesis;
  accumulating an energy value based on a signal that has been decoded based on said hypothesis to produce an accumulated energy value; and
  repeatedly comparing said accumulated energy value to a dump threshold up until a maximum of a dwell count (duration) so that the dwell count varies and said accumulated energy value is compared to a second threshold when the maximum is reached;
  and wherein the accumulated energy value is summed with a BIAS based on a target SNR (signal-to-noise), together, are repeatedly compared against the dump threshold;
  and wherein if said accumulated energy value falls below the dump threshold, dismissing said hypothesis and loading a new hypothesis while other searchers continue to evaluate their hypotheses.

18. The method of claim 17 wherein loading a hypothesis includes loading a hypothesis that is independent of other hypotheses.

19. The method of claim 17 wherein said hypothesis comprises a code offset usable to decode a wirelessly received signal.

* * * * *